(12) United States Patent
Rautureau et al.

(10) Patent No.: US 11,125,728 B2
(45) Date of Patent: Sep. 21, 2021

(54) REFERENCE BLOCK FOR ULTRASONIC SHEAR WAVES CALIBRATION

(71) Applicants: Airbus Operations, S.L., Getafe (ES); Airbus Operations SAS, Toulouse (FR)

(72) Inventors: Aurelien Rautureau, Toulouse (FR); Carlos Jusdado Serrano, Getafe (ES); Yolanda De Frutos Galindo, Getafe (ES)

(73) Assignees: AIRBUS OPERATIONS S.L., Getafe (ES); AIRBUS OPERATIONS SAS, Toulouse (FR)

( * ) Notice: Subject to any disclaimer, the term of this patent is extended or adjusted under 35 U.S.C. 154(b) by 209 days.

(21) Appl. No.: 16/553,327

(22) Filed: Aug. 28, 2019

(65) Prior Publication Data

US 2020/0072797 A1 Mar. 5, 2020

(30) Foreign Application Priority Data

Aug. 30, 2018 (EP) ..................................... 18382635

(51) Int. Cl.
*G01N 29/30* (2006.01)
*G01N 29/04* (2006.01)

(52) U.S. Cl.
CPC ........... *G01N 29/30* (2013.01); *G01N 29/043* (2013.01)

(58) Field of Classification Search
CPC ......... G01N 2291/0422; G01N 29/043; G01N 29/30
See application file for complete search history.

(56) References Cited

U.S. PATENT DOCUMENTS

| 4,173,139 | A | * | 11/1979 | Conn | G01N 29/4463 73/1.84 |
| 4,704,892 | A | * | 11/1987 | Tarnai | G01N 29/30 29/428 |
| 10,359,278 | B2 | * | 7/2019 | Jara Blazquez | G01N 29/07 |
| 2005/0092091 | A1 | * | 5/2005 | Greelish | G01N 29/4427 73/617 |
| 2006/0213250 | A1 | * | 9/2006 | Vaccaro | G01N 29/11 73/1.86 |
| 2016/0113634 | A1 | * | 4/2016 | Kim | A61B 8/587 702/97 |

FOREIGN PATENT DOCUMENTS

| CN | 205120670 U | 3/2016 |
| JP | H0727751 A | 1/1995 |

OTHER PUBLICATIONS

European Search Report; priority document.

* cited by examiner

*Primary Examiner* — Francis C Gray
(74) *Attorney, Agent, or Firm* — Greer, Burns & Crain, Ltd.

(57) ABSTRACT

A reference block for ultrasonic shear waves calibration, comprising slots, wherein the reference block has at least two different thicknesses, each thickness comprising two cavities with at least one slot being provided at each cavity. Preferably, the reference block comprises a plurality of steps, each step defining a different thickness.

12 Claims, 2 Drawing Sheets

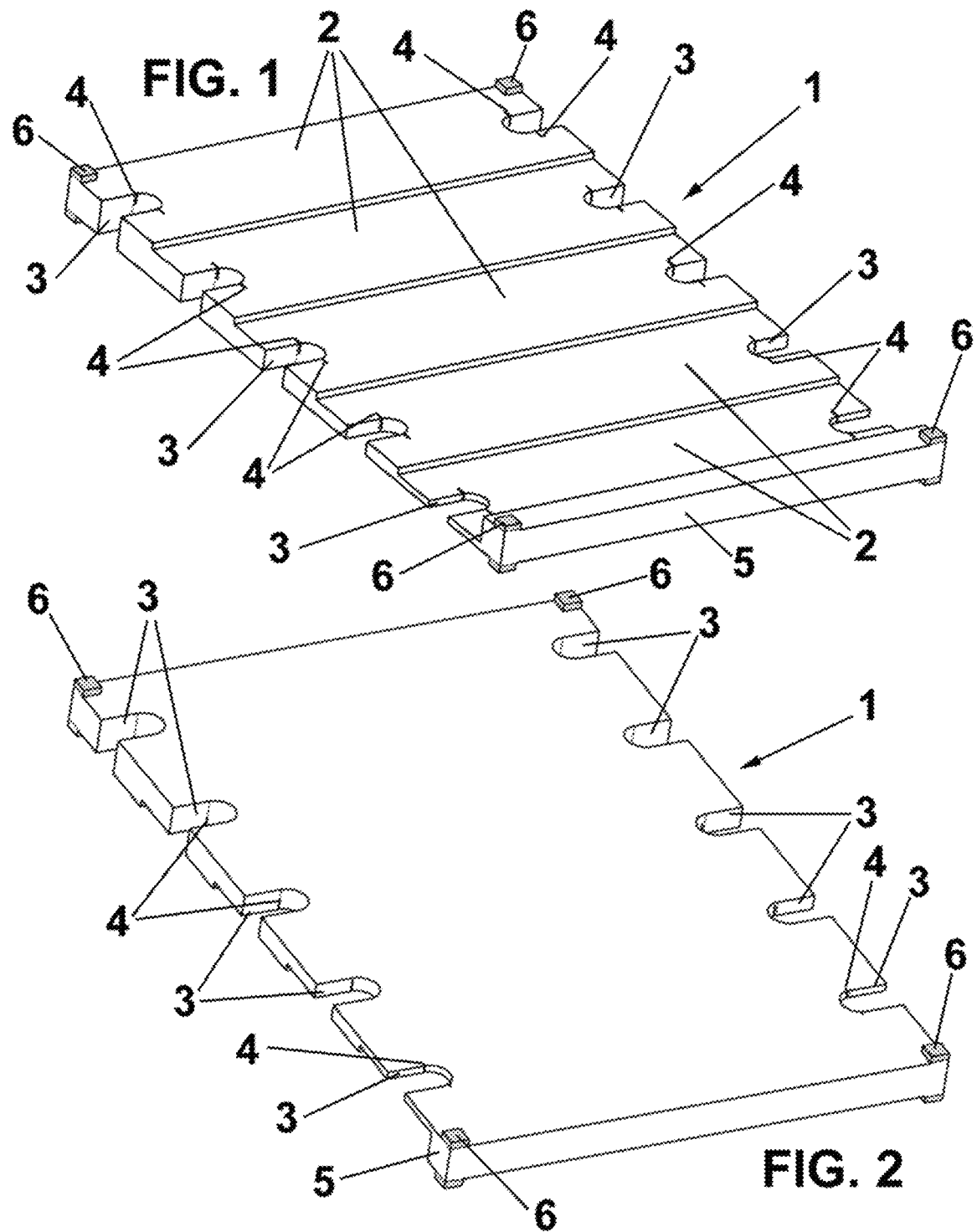

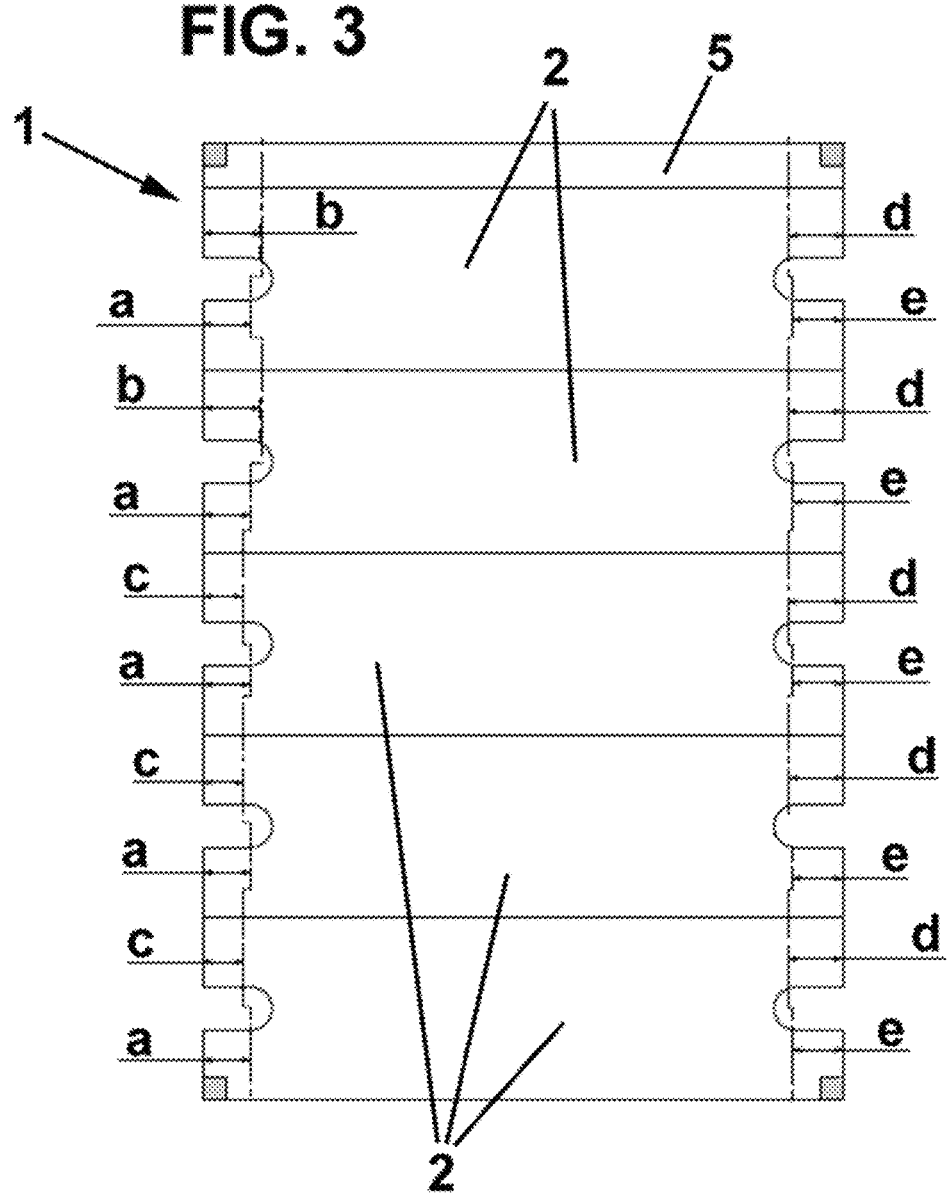
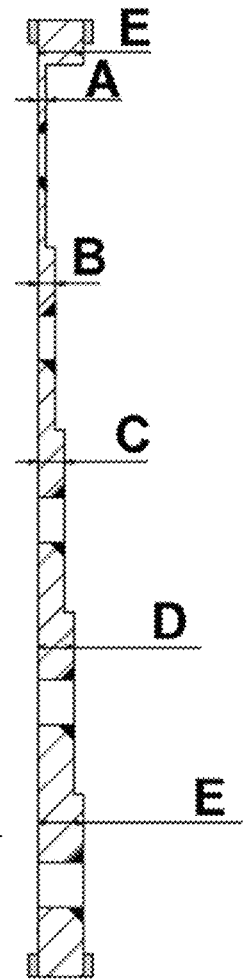

REFERENCE BLOCK FOR ULTRASONIC SHEAR WAVES CALIBRATION

CROSS-REFERENCES TO RELATED APPLICATIONS

This application claims the benefit of the European patent application No. 18382635.3 filed on Aug. 30, 2018, the entire disclosures of which are incorporated herein by way of reference.

FIELD OF THE INVENTION

The present invention refers to a reference block for ultrasonic shear waves calibration when inspecting metallic structures, which particularly looks for non-accessible cracks propagating from fasteners holes, for example, in a metallic structure of an aircraft.

BACKGROUND OF THE INVENTION

During the aircraft life some relevant areas are periodically inspected to ensure the integrity of the structure is kept.

A particular and not obvious case is a metallic structure not directly accessible: one example is a piece hidden by another component, another example is the requirement to inspect for cracks starting from the opposite surface.

An ultrasound method using shear waves technique is currently applied. This method comprises using an ultrasound device (instrument and probe) that introduces an ultrasound beam through the accessible surface of the component in such a way that the ultrasound beam propagates inside the part by successive rebounds against the surfaces.

If a crack exists, the ultrasound beam rebounds against it and comes back to the device. The device can be adjusted to relate the signal received to the position and size of the crack (ultrasound device calibration).

Fatigue corner cracks growing from fastener holes are currently required to be detected during maintenance tasks of the aircraft.

In order to calibrate the ultrasound device, a reference block of the same thickness, the same fastener hole diameters and containing artificial slots must be manufactured.

Using this reference block, the ultrasound device is adjusted to locate the echo from the hole at a certain time base position. Sliding the probe towards the slotted side decreases the amplitude of the echo from the hole edge and a new one, at different time base position, increases. This is the typical change-over pattern of the cracks growing from the fastener hole edge. Currently, reference blocks are used at both surfaces to calibrate for cracks starting at each side.

Today, the number of reference blocks required, currently one of each thickness and for each hole diameter, complicates the maintenance and inspection tasks of the aircraft.

SUMMARY OF THE INVENTION

The present invention relates to the definition of a generic reference block to avoid manufacturing a new one for each part thickness or each fastener diameter.

Additionally, the present invention relates to the design of the block edges to get a gap between the block and the working surface to prevent losses of the ultrasonic energy.

With the reference block according to the present invention it is possible to solve the drawbacks, providing other advantages that are described below.

The reference block for ultrasonic shear waves calibration according to the present invention comprises slots, and it is characterized in that the block has at least two different thicknesses, each thickness comprising two cavities, with at least one slot being provided at each cavity.

According to a preferred embodiment, the block comprises a plurality of steps, each step defining a different thickness.

Advantageously, the slots are made in the edges of cavities of the block, and the cavities are formed at opposed sides of the block.

Furthermore, each cavity comprises two slots, and preferably the slots at each thickness are placed at different distances from the side where the cavity is formed.

According to a preferred embodiment, each cavity has a U shape to closely simulate the change-over pattern from a hole while allowing the manufacture of a slot at a distance larger than the simulated radius of the hole, but the cavity can have any suitable shape.

Furthermore, the block advantageously comprises two faces, a first face with a stepped configuration and a second face with a flat configuration.

The block can also comprise a rim in a side of the block with the smallest thickness, so that the thickness of the rim is the same as the thickness of the opposed side of the block (the greatest thickness side).

Furthermore, the block can also comprise supports placed in its corners, preferably placed at both faces of the block.

With the reference block according to present invention, the number of reference blocks the aircraft operators and maintenance centers and other facilities need to manufacture or buy are reduced, reducing also the corresponding storage, inventory and periodical monitoring costs, Furthermore, the reference block according to the present invention improves the calibration process involved in inspecting parts or components for cracks and to speed up the inspection procedure development so as avoid the need to manufacture dedicated blocks to define inspection parameters.

BRIEF DESCRIPTION OF THE DRAWINGS

For a better understanding the above explanation and for the sole purpose of providing an example, some non-limiting drawings are included that schematically depict a practical embodiment.

FIG. 1 is a perspective view of the reference block according to the present invention, showing the first face of the block;

FIG. 2 is a perspective view of the reference block according to the present invention, showing the second face of the block;

FIG. 3 is a plan view of the reference block according to the present invention, showing the distance of the slots from the nearest side of the block; and FIG. 4 is a cross-section view of the reference block according to the present invention.

DETAILED DESCRIPTION OF A PREFERRED EMBODIMENTS

The reference block for ultrasonic shear waves calibration is used as a reference block as described previously for inspecting metallic structures by shear waves for non-accessible cracks, such as non-accessible cracks in aircraft. Its use is the same as conventional reference blocks, but just one reference block according to the present invention substitutes for a plurality of conventional reference blocks. The reference block according to the present invention is identified as a whole by numeral reference 1, defining a first face (shown in FIG. 1) and a second face (shown in FIG. 2).

The block according to the shown embodiment defines a rectangular shape, but it could have any other suitable shape, such as a square shape.

As shown in the drawings, the block 1 comprises different thicknesses 2, five in the embodiment shown, but the block 1 could comprise any other suitable number of thicknesses.

According to this embodiment, each thickness 2 is defined by a step, and each thickness comprises two cavities 3 placed at two opposed sides of the block 1.

Each cavity 3 defines a U shape, according to the embodiment shown, but the cavities 3 could define any other suitable shape.

Furthermore, each cavity 3 comprises at least one slot 4 formed at its edge, which is used for calibration. According to the embodiment shown, each cavity 3 comprises two slots 4, which are made at different distances from the nearest side of the block 1.

As shown in FIGS. 1 and 2, the slots 4 are formed at the block 1 in any suitable position.

For example, each cavity 3 can be made by drilling and cutting, and the slots 4 (e.g., of a width of 3 mm) can be made by Electro Discharge Machined (EDM) at three different distances. This simulates three different hole diameters for each step. Therefore, the change-over pattern is obtained for three different fastener hole diameters for each step.

This means that the block 1 according to the invention contains five thicknesses and slots at three distances, so it substitutes for fifteen possible current reference blocks.

Just for reference, steps are designed with an increment of 2 mm, but any suitable value could be defined.

As shown in FIGS. 1 and 2, the first face of the block 1 has a stepped configuration, and the second face of the block 1 has a flat configuration. So that the block 1 has the same thickness at both opposed sides not provided with the cavities, the block 1 comprises a rim 5 at the side with the smallest thickness.

Furthermore, to prevent the contact of the block 1 with a working surface, the block 1 comprises supports 6 placed at its corners, at both sides of the block 1.

Just for reference, in FIG. 3 distance values are shown as a, b, c, d, e, which correspond to the distance from the slot 4 to the side of the block 1.

For example, these values can be the following:
a=10.3 mm
b=12.6 mm
c=8.6 mm
d=11.8 mm
e=11.0 mm These distances relate to the hole diameter as follows:
a simulates cracks from a 9.4 mm diameter hole
b simulates cracks from a 4.8 mm diameter hole
c simulates cracks from a 12.8 mm diameter hole
d simulates cracks from a 6.4 mm diameter hole
e simulates cracks from a 8.0 mm diameter hole Also, for reference, in FIG. 4 thickness values are shown as A, B, C, D, E, which correspond to the thickness of each step.

For example, these values can be the following:
A=2 mm
B=4 mm
C=6 mm
D=8 mm
E=10 mm Even though reference has been made to a specific embodiment of the invention, it is obvious for a person skilled in the art that the reference block described herein is susceptible to numerous variations and modifications, and that all of the details mentioned can be substituted for other technically equivalent ones without departing from the scope of protection defined by the attached claims.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A reference block for ultrasonic shear waves calibration comprising slots, wherein the reference block has at least two different thicknesses, each thickness comprising two cavities with at least one slot being provided at each cavity.

2. The reference block for ultrasonic shear waves calibration according to claim 1, comprising a plurality of steps, each step defining a different thickness.

3. The reference block for ultrasonic shear waves calibration according to claim 1, wherein said slots are made in edges of the cavities of said reference block.

4. The reference block for ultrasonic shear waves calibration according to claim 3, wherein said cavities are formed at opposed sides of the reference block.

5. The reference block for ultrasonic shear waves calibration according to claim 3, wherein each cavity comprises two slots.

6. The reference block for ultrasonic shear waves calibration according to claim 1, wherein the slots at each thickness are placed at different distances from the side where the cavity is formed.

7. The reference block for ultrasonic shear waves calibration according to claim 3, wherein each cavity has a U shape.

8. The reference block for ultrasonic shear waves calibration according to claim 1, wherein the reference block comprises two faces, a first face with a stepped configuration and a second face with a flat configuration.

9. The reference block for ultrasonic shear waves calibration according to claim 1, wherein the reference block comprises a rim in a side of the reference block with a smallest thickness.

10. The reference block for ultrasonic shear waves calibration according to claim 9, wherein a thickness of said rim is the same as the thickness of the opposed side of the reference block.

11. The reference block for ultrasonic shear waves calibration according to claim 1, wherein the reference block comprises supports placed in its corners.

12. The reference block for ultrasonic shear waves calibration according to claim 11, wherein said supports are placed at both faces of the reference block.

* * * * *